(12) United States Patent
Tiemon (10) Patent No.: US 10,197,213 B2
(45) Date of Patent: Feb. 5, 2019

(54) SYSTEMS AND METHODS FOR MOUNTING A ROTATABLE MACHINE

(71) Applicant: General Electric Company, Schenectady, NY (US)

(72) Inventor: Jorg Arrien Tiemon, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 38 days.

(21) Appl. No.: 15/416,929

(22) Filed: Jan. 26, 2017

(65) Prior Publication Data
US 2018/0209578 A1    Jul. 26, 2018

(51) Int. Cl.
F16M 1/00 (2006.01)
F16M 1/04 (2006.01)
F16C 11/06 (2006.01)

(52) U.S. Cl.
CPC .......... F16M 1/04 (2013.01); F16C 11/0695 (2013.01)

(58) Field of Classification Search
CPC .............................. F16M 1/04; F16C 11/0695
USPC ............................................ 248/661; 244/54
See application file for complete search history.

(56) References Cited

U.S. PATENT DOCUMENTS

| | | | |
|---|---|---|---|
| 2,650,050 A | 8/1953 | Chandler | |
| 3,168,270 A | 2/1965 | Bligard et al. | |
| 3,952,973 A | 4/1976 | James | |
| 6,607,165 B1 | 8/2003 | Manteiga et al. | |
| 7,861,535 B2* | 1/2011 | Figueroa | F02C 7/20 60/766 |
| 8,328,133 B2 | 12/2012 | Suciu et al. | |
| 8,640,987 B2* | 2/2014 | Journade | B64D 27/18 244/54 |
| 8,672,260 B2* | 3/2014 | Penda | B64D 27/20 244/54 |

(Continued)

FOREIGN PATENT DOCUMENTS

JP    H06-33628 U    5/1994
KR    10-1331864 B1    11/2013

OTHER PUBLICATIONS

International Search Report and Written Opinion issued in connection with corresponding PCT Application No. PCT/US2017/064798 dated Mar. 19, 2018.

*Primary Examiner* — Todd M Epps
(74) *Attorney, Agent, or Firm* — General Electric Company; Pamela Kachur (57) ABSTRACT

A mounting system includes a rotatable machine, a frame circumscribing the rotatable machine, and a plurality of mounting elements. Each mounting element of the plurality of mounting elements includes a pin member and a joint member. The joint member includes a rotatable joint capable of three degrees of freedom of rotation, and the joint member is slidably coupled to the pin member, such that each mounting element is capable of four degrees of freedom of motion. The plurality of mounting elements are further coupled between the frame and the rotatable machine and spaced circumferentially about the rotatable machine, such that the rotatable machine is able to expand and contract radially within the frame. The mounting system provides a uniform stiffness in any radial direction from the engine centerline within the lateral-vertical engine plane.

20 Claims, 5 Drawing Sheets

(56) References Cited

U.S. PATENT DOCUMENTS

| | | | | |
|---|---|---|---|---|
| 8,757,648 B1* | 6/2014 | Winter | ............... | B60G 7/001 |
| | | | | 280/124.134 |
| 8,950,724 B2* | 2/2015 | Hurst | ............. | F01D 25/28 |
| | | | | 244/54 |
| 9,157,471 B2* | 10/2015 | Jungeberg | ......... | F16C 11/0604 |
| 2005/0080416 A1 | 4/2005 | Ryan et al. | | |
| 2014/0161592 A1 | 6/2014 | Belmonte et al. | | |

\* cited by examiner

SYSTEMS AND METHODS FOR MOUNTING A ROTATABLE MACHINE

BACKGROUND

The field of the disclosure relates generally to rotatable machinery and, more particularly, to a method and system for maintaining collinear alignment of the rotatable machine during startup and operation.

At least some mounting systems for rotatable machines, such as gas turbine engines, include a single fixed pin mounting element and a single sliding pin mounting element. These mounting elements are designed to secure the rotatable machine to a bulkhead or deck, such as a deck of a seagoing vessel, so that an output shaft of the rotatable machine, which rotates about the axis of rotation of the machine, can be mechanically coupled to a drive shaft, such as a generator shaft or a propeller shaft, of the vessel.

Many conventional mounting systems are designed such that the axis of rotation of the rotatable machine is initially offset from the drive shaft until the rotatable machine has reached a particular set of operating parameters when the axis of rotation translates into alignment with the centerline. Thus, when the rotatable machine is cold or climbing to a nominal operating temperature, the axis of rotation of the rotatable machine, and hence the output shaft, may not align with the drive shaft.

BRIEF DESCRIPTION

In one aspect, a mounting system is provided. The mounting system includes a rotatable machine, a frame circumscribing the rotatable machine, and a plurality of mounting elements. Each mounting element of the plurality of mounting elements includes a pin member and a joint member. The joint member includes a rotatable joint capable of three degrees of freedom of rotation, and the joint member is slidably coupled to the pin member, such that each mounting element is capable of one degree of freedom of motion and three degrees of freedom of rotation. The plurality of mounting elements are further coupled between the frame and the rotatable machine and evenly spaced circumferentially about the rotatable machine, such that the rotatable machine is able to expand and contract radially within the frame.

In another aspect, a mounting system is provided. The mounting system includes a frame, and a plurality of mounting elements coupled to the frame and evenly spaced circumferentially about the frame. Each mounting element includes a pin member, and a joint member. The joint member includes a rotatable joint capable of three degrees of freedom of rotation, and the joint member is slidably coupled to the pin member, such that each mounting element is capable of one degree of freedom of motion and three degrees of freedom of rotation.

In yet another aspect, a method is provided. The method includes coupling a plurality of mounting elements between a rotatable machine and a frame circumscribing the rotatable machine, in which the rotatable machine has an axis of rotation, and the frame defines a centerline. The method further includes permitting the rotatable machine to expand and contract radially within the frame, and maintaining the axis of rotation of the rotatable machine in collinear alignment with the centerline.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a system for mounting a rotatable machine. More particularly, the present disclosure relates to a system in which a rotatable machine is mounted by a plurality of mounting elements within a frame. Each mounting element has one degree of freedom of motion and three degrees of freedom of rotation, and the mounting elements are equally spaced circumferentially evenly about the frame.

In operation, the rotatable machine is allowed to expand and contract radially within the frame, while an axis of rotation of the rotatable machine is maintained in alignment with a centerline. A drive shaft of a vessel propelled by the rotatable machine is also in alignment with the centerline. Thus, the axis of rotation of the rotatable machine is kept in alignment with the drive shaft of the vessel.

Figure 1:
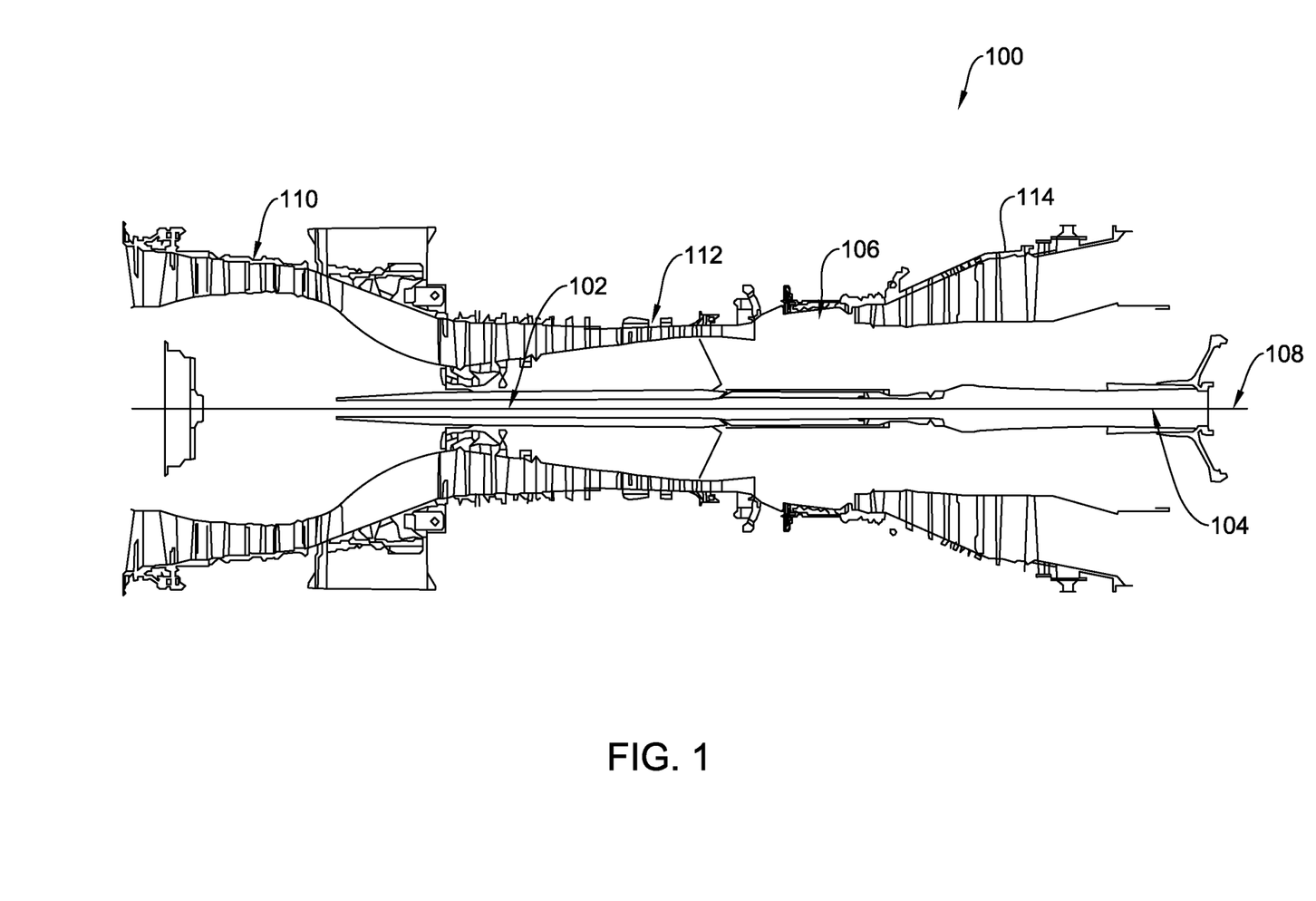
FIG. 1 is a cross-sectional view of an exemplary rotatable machine, in which the rotatable machine is a gas turbine engine.

FIG. 1 is a cross-sectional view of an exemplary rotatable machine 100. In the illustrated embodiment, rotatable machine 100 is a gas turbine engine. However, in alternative embodiments, rotatable machine 100 may be any other rotatable machine, such as such as any non-turbine engine, any marine engine, any aircraft engine, and the like.

Rotatable machine 100 includes a forward mounting location 102 and an aft mounting location 104. As described below, rotatable machine 100 is mounted to a frame by one or more mounting elements at a forward mounting location 102 and at an aft mounting location 104. Rotatable machine 100 further includes a combustion chamber 106, within which a hydrocarbon fuel, such as jet fuel, is combusted, producing as a result, heat and thrust. In addition, rotatable machine 100 has an axis of rotation 108, about which one or more turbines or blades, such as blades 110, 112, and 114, rotate during operation of rotatable machine 100.

Figure 2:
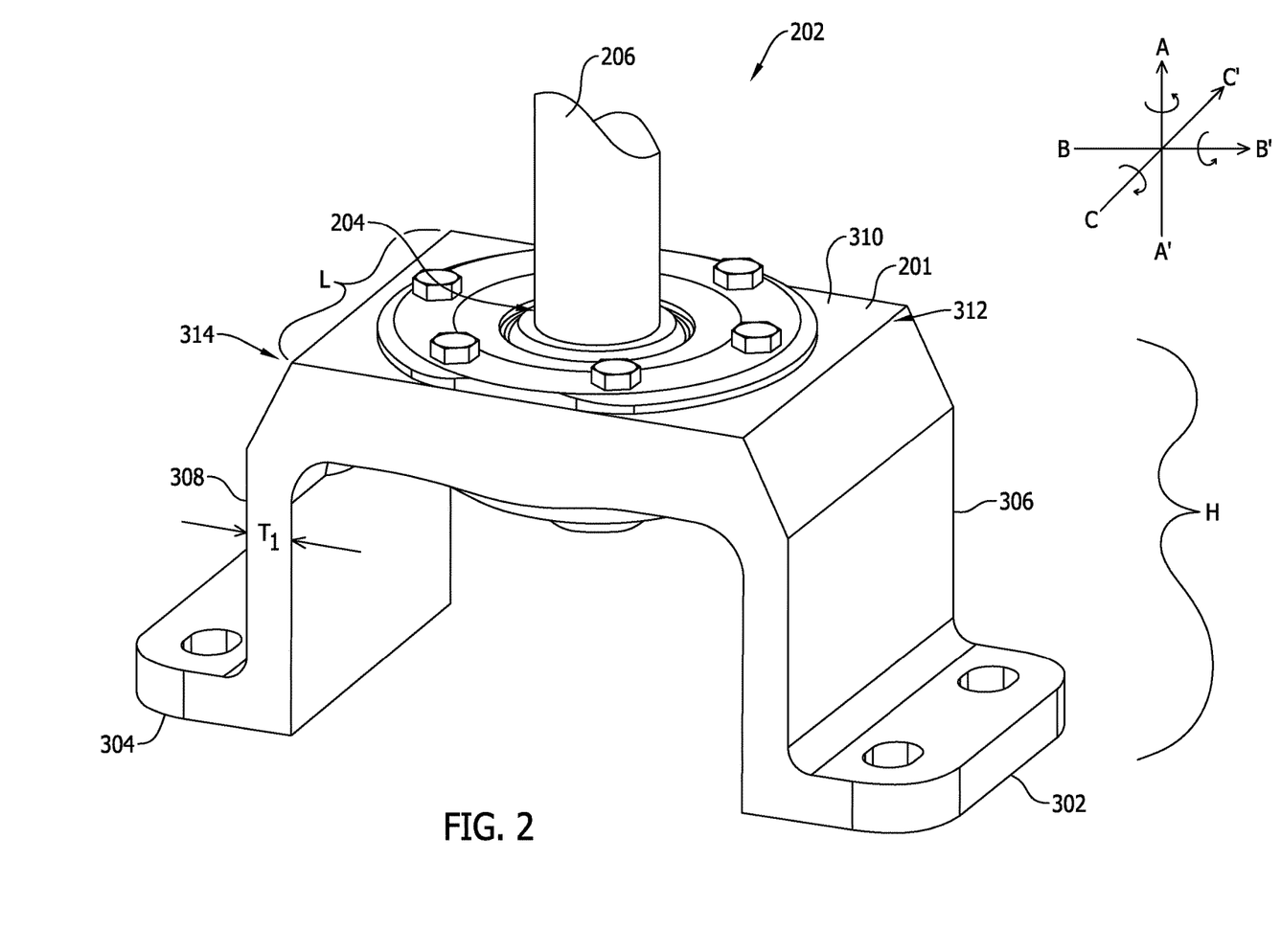
FIG. 2 is a perspective view of an exemplary mounting element of the mounting system shown in FIG. 1.

FIG. 2 is a perspective view of an exemplary mounting element 202. In the exemplary embodiment, mounting element 202 includes a compliance box 201, a joint member or joint assembly 204, and a pin member 206. Joint assembly 204 is mounted in and supported by compliance box 201. Further, as described in greater detail below, pin member 206 is slidably coupled to joint assembly 204. In some embodiments, mounting element 202 may include a plurality of pin members.

Figure 3:
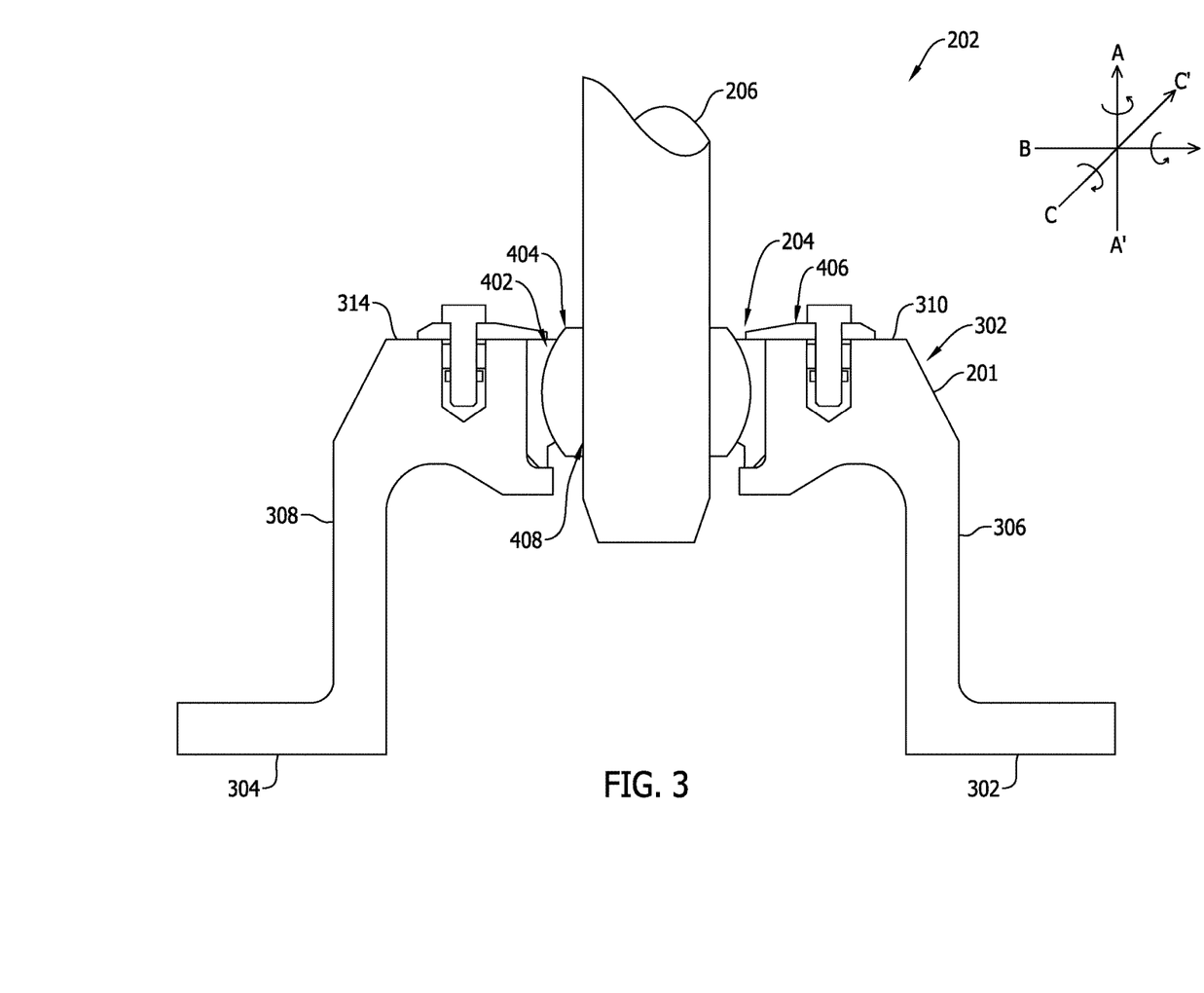
FIG. 3 is a cross-sectional view of an exemplary joint assembly of the mounting element shown at FIG. 2.

In the exemplary embodiment, compliance box 201 is a raised substantially rectangular flange and includes a first foot 302 and a second foot 304, each of which is coupled by one or more bolts (not shown) to a frame (as described elsewhere herein). Compliance box 201 further includes a first wall 306 and a second wall 308, each of which extends orthogonally away from foot 302 or 304 to which at least one of wall 306 or 308 is respectively coupled. A plate 310 is coupled to an end 312 of first wall 306 and an end 314 of second wall 308. Plate 310 thus extends between first wall 306 and second wall 308. In the exemplary embodiment, an as shown, compliance box 201 is a monolithic structure constructed from a single block of material, such as a single block of aluminum or steel. Further, joint assembly 204 is integral with or coupled within plate 310 and supported, on the whole, by compliance box 201.

The dimensions of compliance box 201 are variable. For example, first wall 306 and second wall 308 have a height, H, and a thickness T1. The stiffness of compliance box 201 can be adjusted by varying any of T1, H, and/or L. More particularly, the stiffness of compliance box 201 can be increased by increasing T1 and/or L. Similarly, the stiffness of compliance box 201 can be decreased by increasing H. In the exemplary embodiment, the stiffness of compliance box 201 is increased by decreasing H, and the stiffness of compliance box 201 is decreased by increasing H.

Compliance box 201 is therefore capable of functioning as an adjustable stiffness mounting system for any size rotatable machine 100. For example, the dimensions of compliance box 201 may be increased to add stiffness to compliance box 201 for the support of a heavier or more massive rotatable machine 100. Similarly, the dimensions of compliance box 201 may be decreased for a lighter or less massive rotatable machine 100.

Further, compliance box 201 is sufficiently stiff in both of the circumferential and axial directions (as described herein with reference to rotatable machine 100) to accommodate any size rotatable machine 100. The mounting system provides a uniform stiffness in any radial direction from the engine centerline within the lateral-vertical engine plane with respect to rotatable machine 100, such that rotatable machine 100 is supported in any radial direction from the engine centerline within the lateral-vertical engine plane by three or more compliance boxes 201, irrespective of the weight or mass of rotatable machine 100. Compliance box 201 is therefore customizable to different sizes of rotatable machine 100, and an optimal stiffness may be accomplished for any size rotatable machine 100, including based upon engine dynamics associated therewith.

FIG. 3 is a cross-sectional view of joint assembly 204 mounted within compliance box 201. Joint assembly 204 is a rotatable joint, and in the exemplary embodiment, joint assembly 204 is a rotatable ball and socket joint. Specifically, joint assembly 204 includes a race 402 and a truncated ball 404 that is received by race 402. In some embodiments, race 402 is split in half and truncated ball 404 is mounted between the two halves of race 402. In other embodiments, race 402 is a unitary element and is heated, such that truncated ball 404 is able to fit, during installation, within race 402. A retaining plate 406 is mounted on compliance box 201 to secure race 402 within compliance box 201.

In the exemplary embodiment, pin member 206 slidably couples to joint assembly 204. More particularly, pin member 206 is slidably received within an aperture or cylindrical passage 408 of truncated ball 404. Thus, as shown, joint assembly 204 is capable of three degrees of freedom of rotation and one degree of freedom of translation in. Specifically, three degrees of freedom of rotation are imparted about the axes A-A', B-B' and C-C', and a fourth degree of freedom of sliding motion is imparted along the axis of the pin A-A'. In other words, truncated ball 404 is able to rotate within race 402 about the axis A-A' and about the axis B-B' and about the axis C-C'. Pin member 206 is further able to slide axially along the axis A-A' within cylindrical passage 408. Thus, joint assembly 204 includes race 402 that allows freedom of rotation in a first direction, second direction, and a third direction (e.g., about axes A-A', B-B', and C-C').

Although mounting systems having different numbers of mounting elements are described below, it will be understood that any suitable number of mounting elements (e.g., three or more mounting elements, each associated with a respective compliance box) may be used in conjunction with a particular mounting system. In addition, although mounting elements are generally described herein as being evenly circumferentially spaced about a frame, it will be understood that mounting elements may be unevenly circumferentially spaced about a frame. Where mounting elements are unevenly circumferentially spaced about a frame, the stiffness of a compliance box associated with each mounting element may be independently adjusted, as described above, and different from the stiffnesses of one or more other compliance boxes. Moreover, the various mounting systems described herein may be mounted at forward location 102 or aft location 104 of rotatable machine 100, depending, for example, upon the particular implementation.

Figure 4:
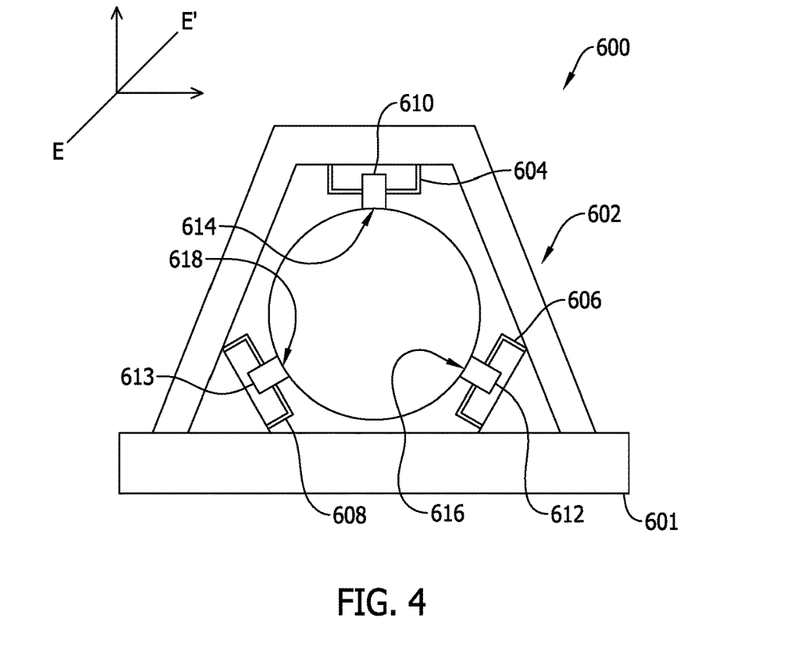
FIG. 4 is a cross-sectional view of an exemplary mounting system that includes three mounting elements coupled to the rotatable machine shown in FIG. 1.

FIG. 4 is a cross-sectional view of an exemplary mounting system 600 that includes a frame 602 and a plurality of mounting elements, such as a first mounting element 604, a second mounting element 606, and a third mounting element 608. Mounting system 600 is mounted on an aft portion of rotatable machine 100, such as at aft mounting location 104 (shown in FIG. 1). In the exemplary embodiment, frame 602 defines a centerline E-E', with which, as described below, axis of rotation 108 of rotatable machine 100 is maintained in alignment. In some embodiments, mounting system 600 is mounted on a forward portion of rotatable machine 100, such as forward mounting location 102.

In the exemplary embodiment, mounting elements 604, 606, and 608 are identical to mounting element 202. In some embodiments, frame 602 includes a base member 601 and fully circumscribes rotatable machine 100 in combination with base member 601. In other embodiments, frame 602 does not include base member 601 but fully circumscribes rotatable machine 100 as a standalone component.

Further, each mounting element 604, 606, and 608 is coupled between frame 602 and rotatable machine 100. More particularly, each mounting element 604, 606, and 608 is coupled to frame 602, such as by a plurality of bolts (not shown), and to rotatable machine 100 by a pin member, such as pin members 610 and 612, and 613 which are, again, identical to pin member 206. Mounting elements 604, 606, and 608 are further spaced circumferentially about rotatable machine 100. For example, mounting element 604 is coupled to rotatable machine 100 at a first location 614, mounting element 606 is coupled to rotatable machine 100 at a second location 616, and mounting element 608 is coupled to rotatable machine 100 at a third location 618. First location 614, second location 616, and third location 618 are evenly circumferentially spaced about rotatable machine 100, such as in one hundred and twenty degree increments. Thus, rotatable machine 100 is mounted within frame 602 by mounting elements 604, 606, and 608.

Figure 5:
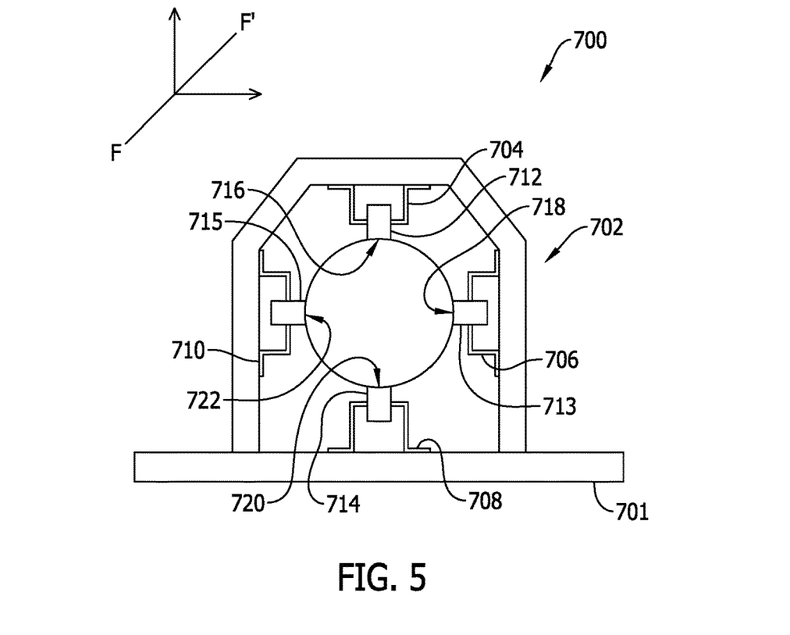
FIG. 5 is a cross-sectional view of an exemplary mounting system that includes four mounting elements coupled to the rotatable machine shown in FIG. 1.

FIG. 5 is a cross-sectional view of an exemplary mounting system 700 that includes a frame 702 and a plurality of mounting elements, such as a first mounting element 704, a second mounting element 706, a third mounting element 708, and a fourth mounting element 710. Mounting system 700 is mounted on an aft portion of rotatable machine 100, such as at aft mounting location 104 (shown in FIG. 1). In some embodiments, mounting system 700 is mounted on a forward portion of rotatable machine 100, such as forward mounting location 102. In the exemplary embodiment, frame 702 defines a centerline F-F', with which, as described below, an axis of rotation 108 of rotatable machine 100 is maintained in alignment.

In the exemplary embodiment, mounting elements 704, 706, 708, and 710 are identical to mounting element 202. In some embodiments, frame 702 includes a base member 701 and circumscribes rotatable machine 100 in combination with base member 701. In other embodiments, frame 702 does not include base member 701 but fully circumscribes rotatable machine 100 as a standalone component.

Further, each mounting element 704, 706, 708, and 710 is coupled between frame 702 and rotatable machine 100. More particularly, each mounting element 704, 706, 708, and 710 is coupled to frame 702, such as by a plurality of bolts (not shown), and to rotatable machine 100 by a pin member, such as pin members 712, 713, 714, and 715, which are, again, identical to pin member 206. Mounting elements 704, 706, 708, and 710 are further evenly spaced circumferentially about rotatable machine 100. For example, mounting element 704 is coupled to rotatable machine 100 at a first location 716, mounting element 706 is coupled to rotatable machine 100 at a second location 718, mounting element 708 is coupled to rotatable machine 100 at a third location 720, and mounting element 710 is coupled to rotatable machine 100 at a fourth location 722. First location 716, second location 718, third location 720, and fourth location 722 are evenly circumferentially spaced about rotatable machine 100, such as in ninety degree increments. Thus, rotatable machine 100 is mounted within frame 702 by mounting elements 704, 706, 708, and 710. Therefore the mounting system provides a uniform stiffness in any radial direction from the engine centerline within the lateral-vertical engine plane.

Figure 6:
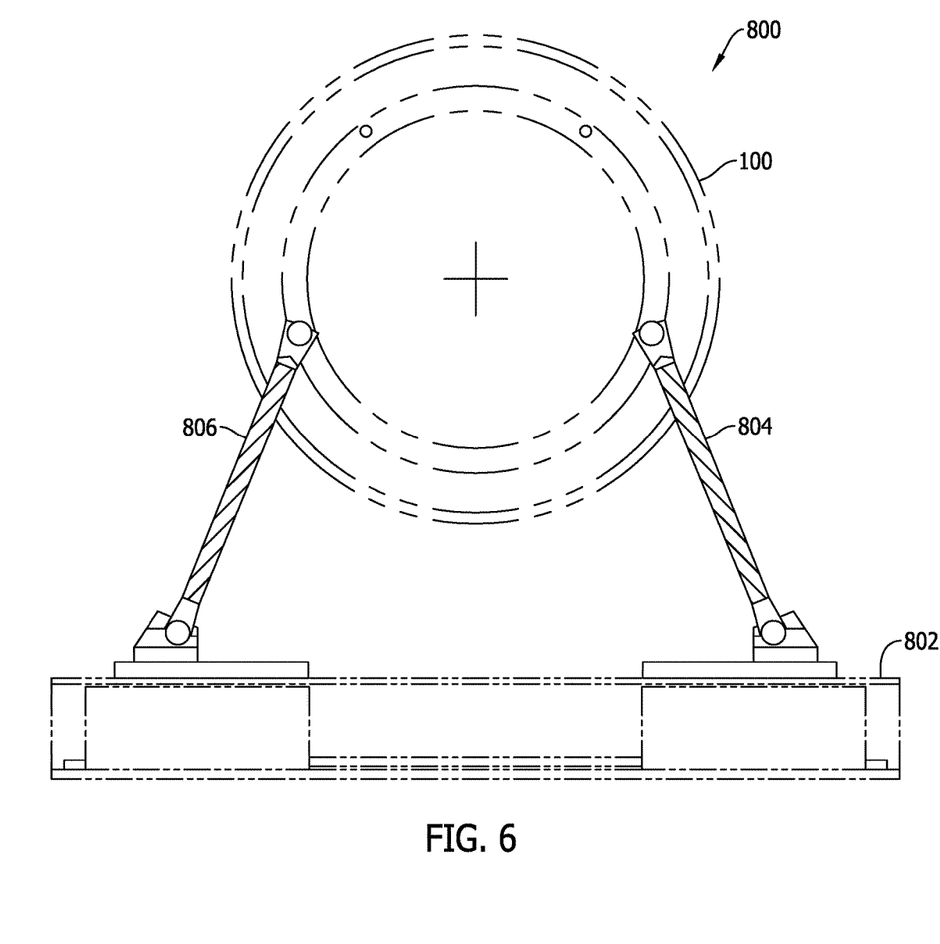
FIG. 6 is a front view of an exemplary mounting system that includes a forward mounting element coupled to the rotatable machine shown in FIG. 1.

FIG. 6 is a front view of an exemplary mounting system that includes a mounting element 800 coupled to rotatable machine 100 (shown in FIG. 1). In the exemplary embodiment, mounting element 800 is mounted at a forward portion of rotatable machine 100, such as at forward mounting location 102. In another embodiment, mounting element 800 is mounted at an aft portion of rotatable machine 100, such as at aft mounting location 104. Mounting element includes a base 802, a first strut 804, and a second strut 806. First strut 804 and second strut 806 are coupled to each of base 802 and rotatable machine 100 and extend between base 802 and rotatable machine 100. In operation, and in the exemplary embodiment mounting element 800 is coupled to rotatable machine 100 at forward mounting location 102 and cooperates with an aft located mounting system, such as any of mounting systems 600 and 700, to support rotatable machine 100.

Rotatable machine 100 is thus mounted by a plurality of mounting elements 202 within a frame. For example, in one embodiment, rotatable machine 100 is mounted by first mounting element 604, second mounting element 606, and third mounting element 608 within frame 602 (as shown in FIG. 6). In another embodiment, rotatable machine 100 is mounted by first mounting element 704, second mounting element 706, third mounting element 708, and fourth mounting element 710 within frame 702 (as shown in FIG. 7). Further, as described above, each mounting element 202 is capable of three degrees of freedom of rotation and one degree of freedom of axial motion.

Further still, the stiffness of each mounting element 202, as defined by compliance box 201, may be varied or adjusted to accommodate a particular size of rotatable machine 100. For example, a larger size rotatable machine 100 may be supported by a plurality of compliance boxes 201 that have increased dimensions, such as dimension H (as described above). Similarly, a smaller size rotatable machine 100 may be supported by a plurality of compliance boxes 201 that have decreased dimensions. Compliance box 201 further provides a uniform stiffness in any radial direction from the engine centerline within the lateral-vertical engine plane, as defined with respect to rotatable machine 100.

In operation, rotatable machine 100 generates heat. For example, where rotatable machine 100 is a fuel burning engine, such as a gas turbine engine, the temperature of rotatable machine 100 increases as fuel is burned within combustion chamber 106 of rotatable machine 100. As the temperature of rotatable machine 100 increases, rotatable machine 100 expands radially. Similarly, as the temperature of rotatable machine 100 decreases, rotatable machine 100 contracts radially. Moreover, as rotatable machine 100 expands and contracts radially, the circumference, C, of rotatable machine 100 may increase and decrease.

Rotatable machine 100 is therefore mounted within a frame, such as any of frames 602 and 702, to accommodate variations in the radius, and hence the circumference, of rotatable machine 100. In addition, although frames 602 and 702 permit radial expansion and contraction of rotatable machine 100, frames 602 and 702 simultaneously secure rotatable machine 100, such that axis of rotation 108 of rotatable machine 100 is maintained in alignment with a centerline, such as any of centerlines E-E' and F-F', of frames 602 and 702, respectively.

For example, mounting elements 604, 606, and 608, which include joint assemblies, such as joint assembly 204, cooperate to allow some freedom of rotation about axes A-A', B-B', and C-C' as well as sliding freedom of motion along axis A-A'. Rotatable machine 100 is, in turn, permitted to expand and contract in any direction radially within frame 602 as its operating temperature varies (e.g. as rotatable machine 100 heats up or achieves a nominal operating temperature and/or as rotatable machine 100 cools down or is shut down). Axis of rotation 108 of rotatable machine 100 is, however, maintained in alignment with centerline E-E' of frame 602. In other words, frame 602 and mounting elements 604, 606, and 608 cooperate and are together sufficiently flexible to permit alterations in circumference, C, of rotatable machine 100, but stiff enough to keep axis of rotation 108 in alignment with centerline E-E'.

Thus, where rotatable machine 100 is coupled to and drives a drive shaft (not shown), such as a propeller shaft of a seagoing vessel, variations in circumference, C, of rotatable machine 100 are compensated for in a manner that does not permit axis of rotation 108 to vary from an axis of rotation (which is also in alignment with centerline E-E') of the drive shaft. Mounting system 700 operates in substantially similar fashion, except that mounting system 700 includes a different number of mounting elements.

Embodiments of the system, as described above, facilitate mounting of a rotatable machine within a frame. More particularly, in the exemplary embodiment, a rotatable machine is mounted by a plurality of mounting elements within a frame. Within the frame, the rotatable machine allowed to expand and contract radially, while an axis of rotation of the rotatable machine is maintained in alignment with a centerline. A drive shaft of a vessel propelled by the rotatable machine is also in alignment with the centerline. Thus, the axis of rotation of the rotatable machine is kept in alignment with the drive shaft of the vessel.

Exemplary technical effects of the system described herein include, for example: (a) mounting a rotatable machine within a frame by a plurality of mounting elements; (b) allowing the rotatable machine to expand and contract radially as the temperature of the rotatable machine varies; (c) maintaining an axis of rotation of the rotatable machine in alignment with a centerline defined by the frame, such that a drive shaft of the rotatable machine is kept in alignment with a drive shaft of a vessel powered by the rotatable machine; and (d) maintaining a uniform stiffness in a compliance box of each of the plurality of mounting elements by varying the dimensions of each compliance box based upon the mass, size, and/or engine dynamics of a rotatable machine to be coupled thereto.

Exemplary embodiments of a system for mounting a rotatable machine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where it is desirable to mount a rotatable machine.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mounting system comprising:
a rotatable machine, wherein
said rotatable machine is circumscribed by a frame; and
a plurality of mounting elements, each mounting element of said plurality of mounting elements comprising:
a pin member, and
a joint member comprising a rotatable joint capable of three degrees of freedom of rotation, said joint member slidably coupled to said pin member, such that each mounting element of said plurality of mounting elements is capable of four degrees of freedom of motion, wherein:
said plurality of mounting elements are coupled between said frame and said rotatable machine and spaced circumferentially about said rotatable machine, such that said rotatable machine is able to expand and contract radially within said frame.

2. The mounting system of claim 1, wherein said frame comprises a base member.

3. The mounting system of claim 1, wherein said joint member is slidably coupled to said pin member, such that each mounting element of said plurality of mounting elements is capable of one degree of axial motion.

4. The mounting system of claim 1, wherein said plurality of mounting elements comprise a first mounting element, a second mounting element, and a third mounting element.

5. The mounting system of claim 1, wherein said plurality of mounting elements comprise a first mounting element, a second mounting element, a third mounting element, and a fourth mounting element.

6. The mounting system of claim 1, wherein a centerline is defined with respect to said frame, and wherein said rotatable machine has an axis of rotation, and wherein said plurality of mounting elements are coupled between said frame and said rotatable machine, such that the axis of rotation is maintained in collinear alignment with the centerline during a plurality of operational conditions.

7. The mounting system of claim 6, wherein the plurality of operational conditions comprise at least one of an increasing temperature of said rotatable machine, a decreasing temperature of said rotatable machine, radial expansion of said rotatable machine, and radial contraction of said rotatable machine.

8. The mounting system of claim 1, said rotatable machine comprising an aft end and a distal end, each of said plurality of mounting elements coupled to said aft end of said rotatable machine.

9. The mounting system of claim 1, wherein said joint member comprises a rotatable ball and socket joint.

10. The mounting system of claim 1, wherein said joint member comprises a rotatable ball and socket joint that facilitates the three degrees of rotation of motion.

11. The mounting system of claim 1, said rotatable machine defining radial and axial directions, wherein each mounting element of said plurality of mounting elements provides a uniform stiffness in both of the circumferential and axial directions.

12. A mounting system comprising:
a frame; and
a plurality of mounting elements coupled to said frame and spaced circumferentially about said frame, each mounting element of said plurality of mounting elements comprising:
a pin member, and
a joint member comprising a rotatable joint capable of three degrees of freedom of rotation, said joint member slidably coupled to said pin member, such that each mounting element of said plurality of mounting elements is capable of four degrees of freedom of motion.

13. The mounting system of claim 12, wherein said frame comprises a base member.

14. The mounting system of claim 12, wherein said joint member is slidably coupled to said pin member, such that each mounting element of said plurality of mounting elements is capable of one degree of axial motion.

15. The mounting system of claim 12, wherein said plurality of mounting elements comprise a first mounting element, a second mounting element, and a third mounting element.

16. The mounting system of claim 12, wherein said plurality of mounting elements comprise a first mounting element, a second mounting element, a third mounting element, and a fourth mounting element.

17. The mounting system of claim 12, wherein said joint member comprises a rotatable ball and socket joint.

18. A method for maintaining alignment of a plurality of rotatable machines, said method comprising:
coupling a plurality of mounting elements between a rotatable machine and a frame circumscribing the rotatable machine, the rotatable machine having an axis of rotation, the frame defining a centerline;
permitting the rotatable machine to expand and contract radially within the frame; and
maintaining the axis of rotation of the rotatable machine in collinear alignment with the centerline.

19. The method of claim 18 further comprising aligning the axis of rotation and the centerline during at least one of a cold condition or a shutdown condition.

20. The method of claim 18 further comprising maintaining the axis of rotation and the centerline in collinear alignment during at least one of heatup and operation of the rotatable machine.

* * * * *